(12) United States Patent
Haney et al.

(10) Patent No.: US 7,864,472 B1
(45) Date of Patent: Jan. 4, 2011

(54) FLOPPY DISK INTERFACE WITH MULTIPLE DISK IMAGES

(75) Inventors: David W. Haney, Richmond, KS (US); Lyle T. Bertz, Lee's Summit, MO (US); Christopher J. Mateski, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 929 days.

(21) Appl. No.: 11/788,113

(22) Filed: Apr. 19, 2007

(51) Int. Cl.
*G11B 5/02* (2006.01)
*G06F 13/12* (2006.01)
*G06K 21/06* (2006.01)

(52) U.S. Cl. .............................. 360/55; 710/62; 235/492
(58) Field of Classification Search ........................ None
See application file for complete search history.

(56) References Cited

U.S. PATENT DOCUMENTS

| | | | |
|---|---|---|---|
| 5,159,182 A | 10/1992 | Eisele | |
| 5,224,216 A * | 6/1993 | Gordon et al. | 710/2 |
| 5,321,817 A | 6/1994 | Feinstein | |
| 5,878,282 A * | 3/1999 | Mital | 710/62 |
| 6,089,459 A | 7/2000 | Eisele et al. | |

\* cited by examiner

*Primary Examiner*—Andrew L Sniezek

(57) ABSTRACT

A data storage device has a housing having a size and shape compatible with being inserted into a floppy disk drive. A data storage unit is provided within the housing for storing a plurality of floppy disk data images. A rotating hub is mounted in the housing to receive the spindle driven by the floppy disk drive. The rotating hub has a position encoder for generating a hub position signal. A transducer is mounted to the housing spanning a range of motion of the read/write head of the floppy disk drive. A head position sensor is mounted to the housing for generating a head position signal in response to a sensed location of the read/write head. A controller within the housing is responsive to the hub position signal and the head position signal to identify a position within a sector of a selected one of the floppy disk data images and to exchange data between the transducer and the identified position of the selected floppy disk data image in the data storage unit.

24 Claims, 6 Drawing Sheets

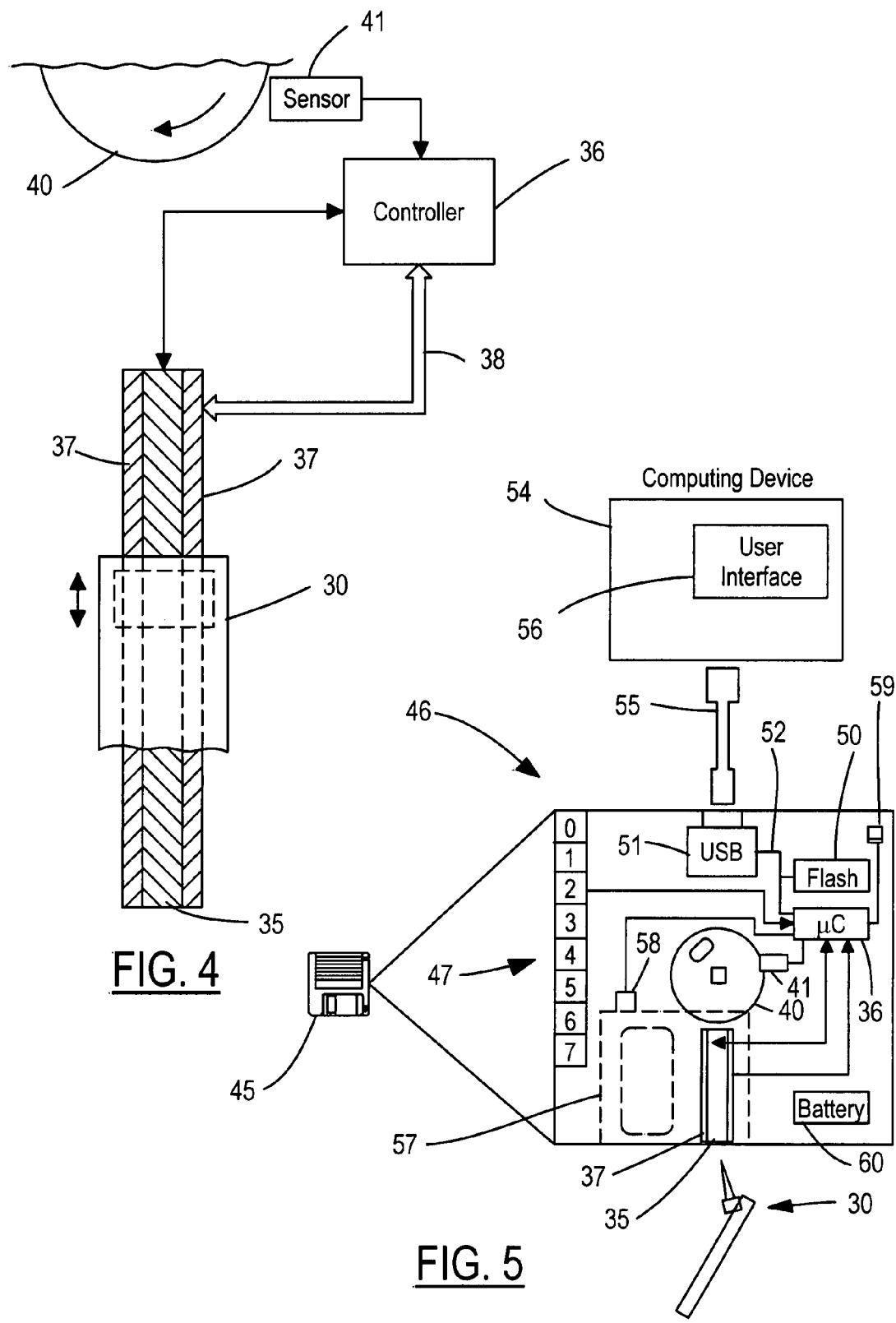

US 7,864,472 B1

FLOPPY DISK INTERFACE WITH MULTIPLE DISK IMAGES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to a portable memory device for installing software and data files in computerized equipment such as PCs, routers, and servers, and, more specifically, to a storage device for emulating a floppy disk but providing a much greater amount of storage capacity than a conventional floppy disk.

Permanent memory in computerized equipment such as personal computers and network servers and routers typically includes fixed storage (e.g., a hard drive) and removable storage (e.g., floppy drives, CD-ROM drives, and mountable flash or zip drives). Executable program files and frequently used data are stored in fixed storage for maximum user convenience and fastest operation. One of the primary uses of removable storage is to transfer program files and data into fixed storage for use in routine operation of the computerized equipment. For example, a technician in a typical enterprise having the job of servicing many computers, routers, and/or servers within the enterprise may be required to periodically visit each piece of equipment for loading certain programs. The technician may carry floppy disks or other portable media having the programs or data stored on them in order to perform the transfers.

As computing power and memory capacities have generally increased for all computerized equipment, so have the typical file sizes for programs and data manipulated by the computerized equipment. The standard 3.5" high density floppy disk holds 1.44 Mbytes. The majority of commonly used application programs greatly exceed the 1.44 Mbyte size, and many would require dozens or hundreds of floppy disks in order to hold them. Likewise, data files that are used by computerized equipment (e.g., routing tables in a router or address translation tables in a server) would require many floppy disks to hold them.

Software distributors have increasingly depended upon other forms of portable storage (e.g., CD-ROM drives and flash drives) or external communication (e.g., USB bus, Firewire bus, and internetworking) for transferring application programs and data to computerized equipment. Over time, computerized equipment manufacturers have increasingly included higher capacity drive interfaces, such as CD-ROM drives and flash card readers, and/or network or bus interfaces in their products. In some instances, newer product lines no longer even offer floppy disk drives. Nevertheless, many organizations have a large installed base of computerized equipment which relies on floppy drives for loading software images or data onto individual pieces of equipment. Updating the software loads of such equipment is complicated by the large number of conventional floppy disks that must be carried to each piece of equipment.

SUMMARY OF THE INVENTION

The present invention allows large program and data files to be transferred into computerized equipment through its floppy disk drive by providing a storage unit having the form factor of a floppy disk but containing a high capacity memory and an interface to emulate a floppy disk.

In one aspect of the invention, a data storage device comprises a housing having a size and shape compatible with being inserted into a floppy disk drive, wherein the floppy disk drive has a spindle and a read/write head. A data storage unit is provided within the housing for storing a plurality of floppy disk data images. A rotating hub is mounted in the housing to receive the spindle driven by the floppy disk drive. The rotating hub has a position encoder for generating a hub position signal. A transducer is mounted to the housing spanning a range of motion of the read/write head of the floppy disk drive. A head position sensor is mounted to the housing for generating a head position signal in response to a sensed location of the read/write head. A controller is provided within the housing responsive to the hub position signal and the head position signal to identify a position within a sector of a selected one of the floppy disk data images and to exchange data between the transducer and the identified position of the selected floppy disk data image in the data storage unit.

BRIEF DESCRIPTION OF THE DRAWINGS

FIG. 4 illustrates the transducer and position sensors of the present invention.

FIG. 5 is a schematic diagram of a data storage unit of the invention.

DETAILED DESCRIPTION OF PREFERRED EMBODIMENTS

Figure 1:
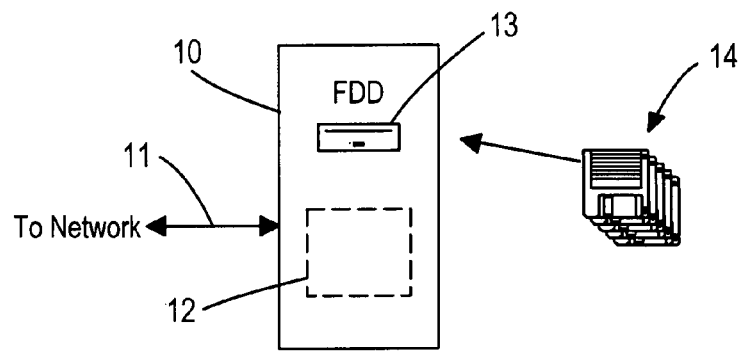
FIG. 1 is a plan view of a unit of computerized equipment having a floppy disk drive.

Referring to FIG. 1, computerized equipment 10 (such as a personal computer, a network server, or a network router) may be coupled to a network by an Ethernet or other LAN connection 11. Equipment 10 has an internal hard drive 12 for storing executable programs and data. A floppy disk drive 13 is built into equipment 10 and accepts floppy disks 14 which may be used to load executable files and data onto hard drive 12. Due to the limited storage on each individual floppy disk, the stack of floppy disks 14 becomes undesirably large for most typical programs and/or data.

Figure 2:
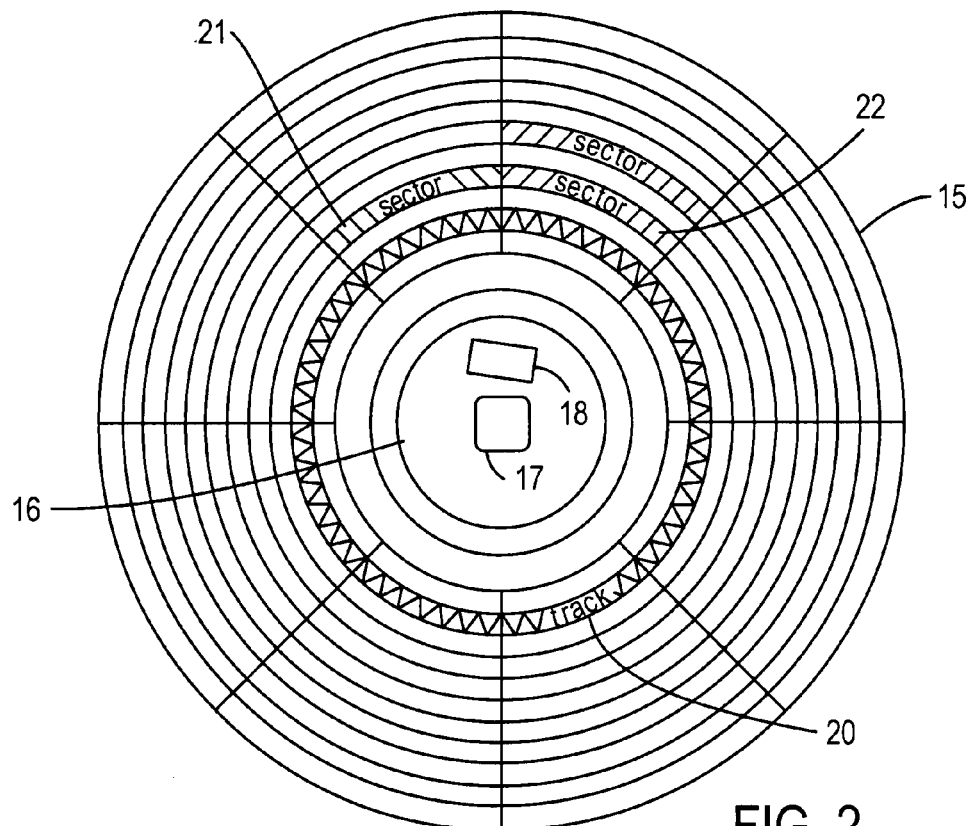
FIG. 2 is a diagram showing tracks and sectors as defined for a standard floppy disk.

The present invention provides a portable memory device that is insertable into a conventional floppy disk drive that emulates the performance of a conventional floppy disk media from the viewpoint of the floppy disk drive while actually providing a storage capacity much greater than the 1.44 Mbyte storage of conventional floppy disk media. The physical layout for storing digital data on a floppy disk media to be emulated is shown in FIG. 2. The floppy disk includes a magnetic disk 15 having a central hub 16 with apertures 17 and 18. Disk 15 is laid out into a plurality of concentric tracks which are radially spaced on disk 15. A track 20 is shown. Disk 15 is also divided into a plurality of sectors which correspond to angular sections of the tracks. Thus, each track includes a plurality of sectors. For example, sectors 21 and 22 are adjacent sectors of the same track.

Aperture 17 is located at the central axis of disk 15 to receives a motor-driven spindle of the floppy disk drive for rotating the disk at a predetermined speed. Aperture 18 is engaged by a position marker of the spindle of the floppy disk drive mechanism to provide a reference position so that any desired sector can be accessed by the drive.

Figure 3:
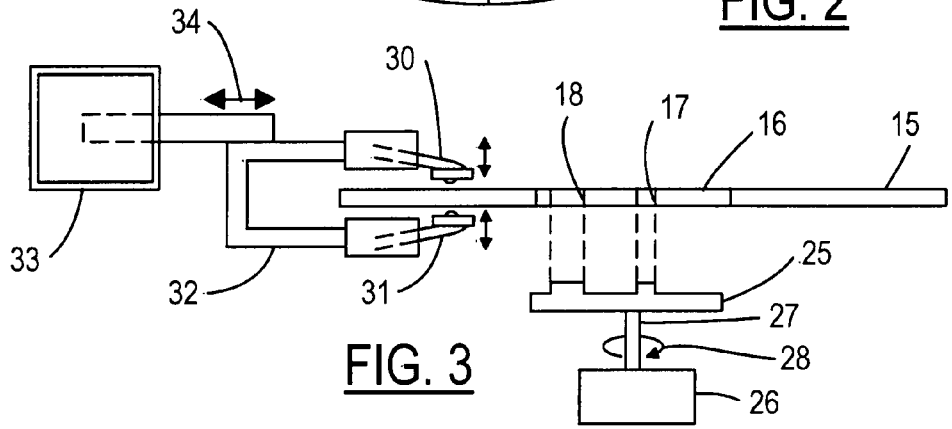
FIG. 3 is a side, diagrammatic view of certain elements within a floppy disk drive.

The operation of a conventional floppy disk drive is shown in greater detail in FIG. 3. A spindle 25 of the floppy disk drive engages apertures 17 and 18 in hub 16. A motor 26 drives the rotation of spindle 25 via a shaft 27 in the direction shown by arrow 28. Upper and lower read/write heads 30 and 31 are mounted to a frame 32 so that they are on opposite sides of disk 15. Heads 30 and 31 are vertically moveable so that each head can be independently moved into contact with disk 15 when reading or writing data at any particular sector of disk 15. In order to locate the read/write heads at any desired track location, a linear motor 33 is connected to frame 32 in order to translate frame 32 in the direction of arrows 34. Thus, in order to address any particular sector, heads 30 and 31 are moved radially to a desired track, and the corresponding head is moved into contact with disk 15 when the desired sector is rotating past the head.

A portion of one example embodiment of the invention is shown in FIG. 4 wherein the magnetic disk of a conventional floppy disk media is simulated by a magnetic transducer strip 35 laid out in a radial direction corresponding to the travel path spanned by read/write head 30. A controller 36 is coupled to transducer 35 for bi-directionally exchanging data with read/write head 30 via magnetic induction between head 30 and transducer 35. In order to determine the track position of head 30, a head position sensor 37 is placed alongside transducer 35 in order to provide a head position signal to controller 36 via a communication line 38. In one preferred embodiment, position sensor 37 is comprised of a pressure sensitive membrane divided into a plurality of separate switches whereby pressure from the read/write head activates a switch corresponding to the desired track. Position sensor 37 may underlie transducer 35 and may have a greater width so that it extends along both sides of transducer 35.

The data storage unit of the present invention may preferably be double sided wherein separate read/write head position sensors are mounted on the opposing surfaces of the simulated disk. Thus, the identification for a particular sector further depends upon which of the read write heads is contacting the data storage device.

The device further includes a hub 40 for engaging the spindle of the floppy disk drive for the purpose of determining which sector the floppy disk drive is attempting to access at any particular time. A position sensor 41 such as a rotary position encoder provides a hub position signal to controller 36 for determining the current sector, and in some embodiments, also the current bit position within a sector.

The data storage device of the present invention is shown in greater detail in FIG. 5. A housing 45 has the overall size and shape of a conventional floppy disk media so that it fits within any conventional 3.5" floppy disk drive. Housing 45 contains the elements shown as an enlarged schematic at 46. In addition to transducer 35, controller 36, pressure sensor 37, hub 40, and sensor 41 already described, housing 45 mounts a plurality of toggle switches 47 coupled to controller 36 to act as an image selector to be manipulated by the user to specify a selected one of the plurality of floppy disk data images that are stored in a flash memory 50, which is also mounted in housing 45. As used herein, flash memory refers to both solid state EEPROM memory and other miniature storage devices such as microdrives. Flash memory 50 is divided into a plurality of partitions so that on each flash partition a respective floppy disk data image can be written in a completely native format. As described in greater detail below, each partition may be pre-formatted to a FAT-16 disk image—however, any type of file system can be written to any partition (e.g., UNIX, QNX, and others).

A communication interface 51 (such as a USB interface, a Firewire interface, or an Ethernet connection) is provided for external communication with controller 36 and/or flash memory 50. External communication with flash memory 50 allows a remote computing device such as a laptop computer 54 to transfer floppy disk data images via a communication cable 55, interface 51, and an internal bus 52 to flash memory 50. As described in greater detail below, computing device 54 has a user interface 56 to allow user control of the content and arrangement of floppy disk data images in the partitions of flash memory 50. Furthermore, user interface 56 may be used to communicate with controller 36 to provide an alternate method for selecting one of the floppy disk data images to be presented by the output of the data storage device via magnetic transducer 35.

Housing 45 has a shutter 57 mounted thereon which is very similar to the shutter of a conventional floppy disk media in order to selectively cover or expose transducer 35 according to the insertion of device 45 into a floppy disk drive unit. A shutter position sensor 58 provides a signal to controller 56 which is indicative of the opened or closed position of shutter 57 (and consequently whether the data storage device is inserted into a floppy disk drive).

A write-protect switch 59 can be manually set in order to prevent attempted writing by the floppy disk drive to the data storage device.

Housing 45 further includes a self-contained battery 60 for powering all the electronics within the data storage device. Battery 60 may be replaceable or rechargeable. Alternatively, the electronics within device 45 may be powered by the communication interface 51 as is known in the art. Preferably, battery power may be coupled to the electronic circuits in response to shutter 57 being placed in its open position.

Figure 6:
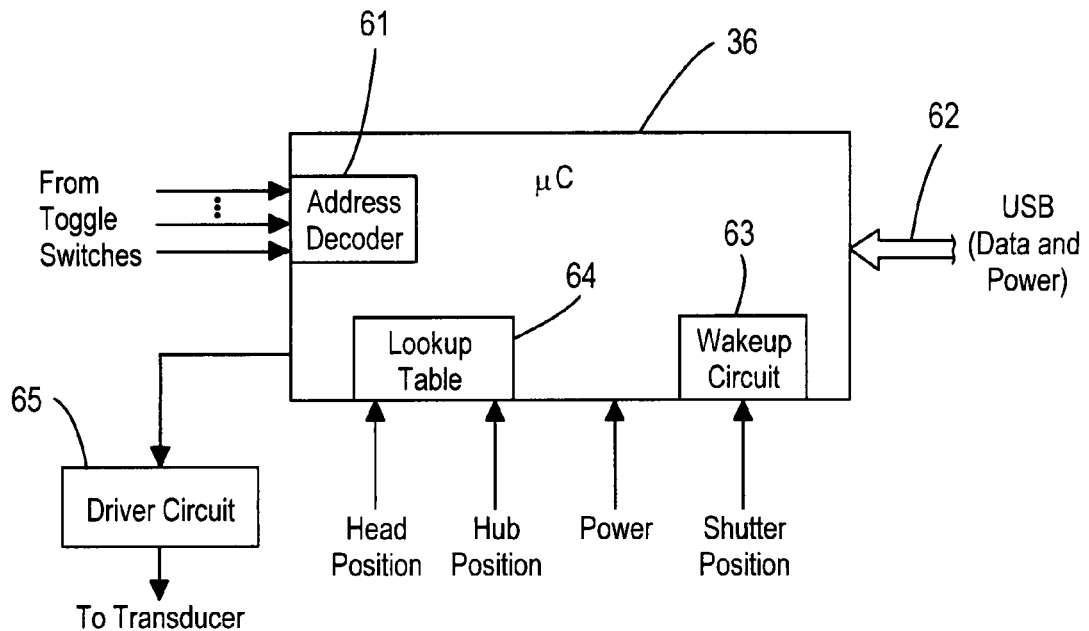
FIG. 6 shows the controller of FIG. 5 in greater detail.

Controller 36 is shown in greater detail in FIG. 6. An address decoder 61 is coupled to toggle switches 47 whereby each respective combinational setting of toggle switches 47 may be used to identify a respective one of the floppy disk data images. Using a set of 8 binary toggle switches as shown in FIG. 5, there are up to 256 possible memory locations (partitions) in the flash memory to select from. For example, each toggle switch can be set to represent either a zero or a one in a parallel addresses presented to address decoder 61. An address of all zeros may preferably correspond to a default partition for containing a default floppy disk data image. The settings of the toggle switches generate an address value in address decoder 61 which is operated on by controller 36 according to its internal programming. As previously described, a USB connection 62 coupled to controller 36 may alternatively be used for selecting a desired partition (i.e., desired for reading or writing data from or to the device).

Controller 36 may include a wake-up circuit 63 responsive to the shutter position sensor so that power is conserved when the shutter is closed (i.e., the device is not inserted into a floppy disk drive) and so that an orderly wake-up sequence can be performed when the shutter position changes to open.

In addition to a power connection, controller 36 is connected to receive a head position signal from the head position sensor and a hub position signal from the hub position sensor. Based upon its internal programming, controller 36 utilizes the position signals to access a look-up table 64 in order to identify the current track and sector being accessed by the floppy disk drive at any particular time. Table 64 may preferably be contained in a ROM which relates the y-position of the read/write head together with the x-position of the spindle (i.e., its rotational position) to determine which sector is to be exposed to the read/write transducer. Controller 36 distinguishes between write operations and read operations and transfers data to or from the flash memory accordingly, as explained below. A driver circuit 65 may preferably be included for coupling controller 36 to the magnetic transducer in order to provide appropriate amplification and filtering of data signals.

Figure 7:
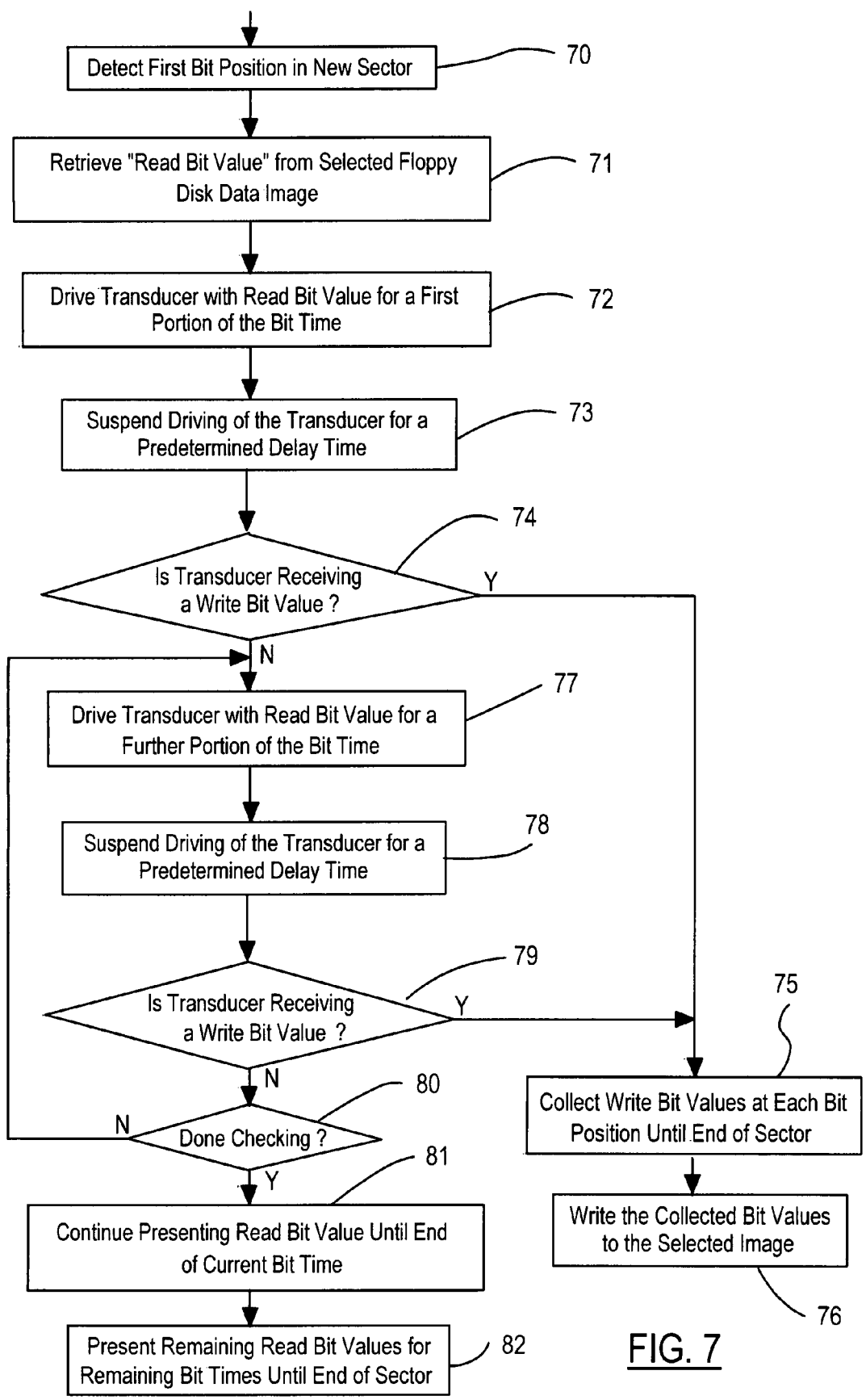
FIG. 7 is a flowchart showing one embodiment of a reading/writing process for exchanging data between the data storage unit and a floppy disk drive.
Figure 9:
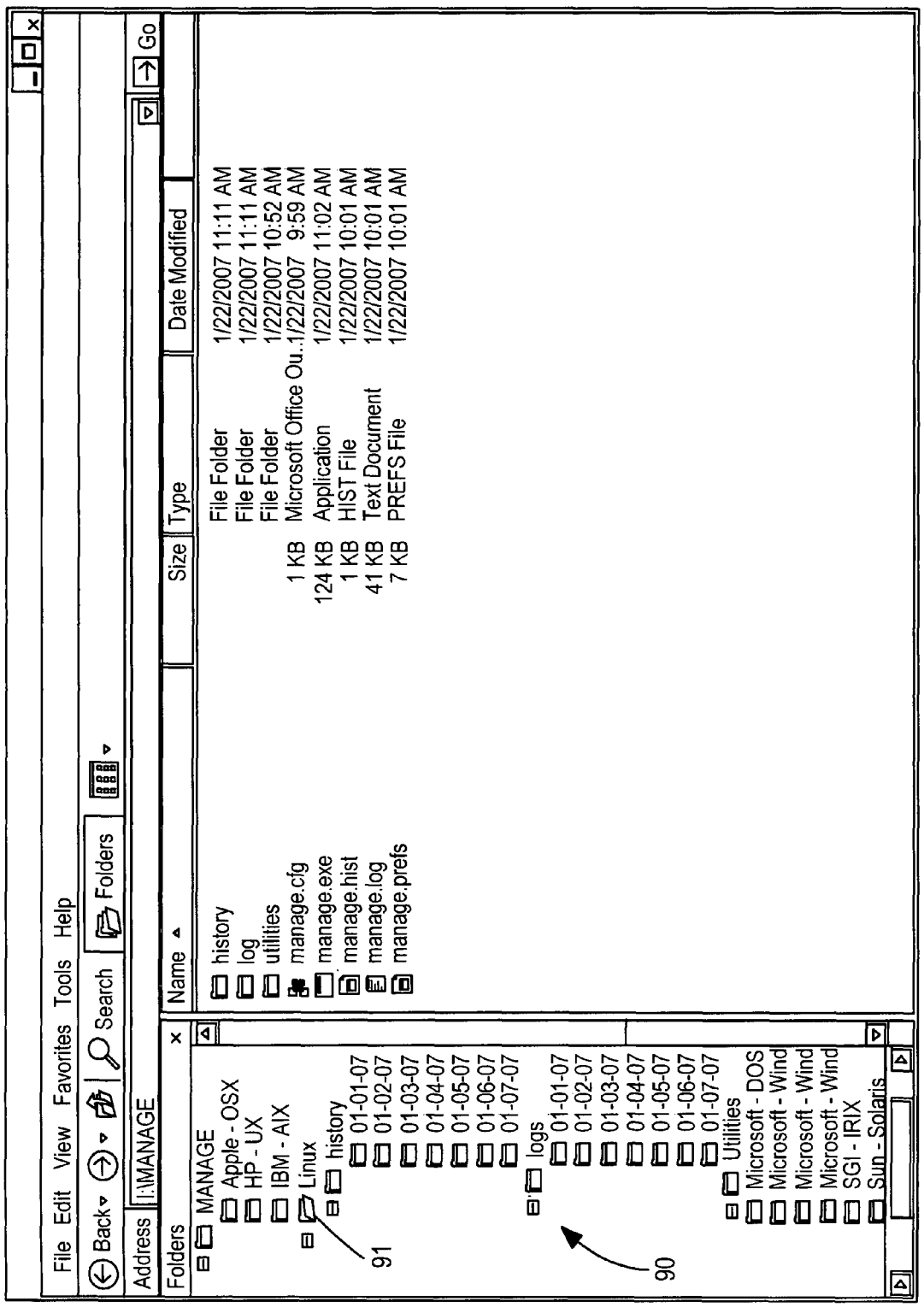
FIG. 9 is a screen shot showing remote access to a Manage partition in a preferred embodiment.

One preferred method of operation of the invention will be described in greater detail in connection with the flowchart of FIG. 7. The data storage device detects a first bit position in a new sector in step 70. More specifically, when the host computer containing the floppy disk drive attempts to access a particular sector on the floppy disk media (or the simulated floppy disk media of the present invention), the read/write head of the floppy disk drive is radially moved to the desired track and then is vertically moved into contact with the floppy disk media as the radial position of the spindle corresponding to the desired sector is approached. The head position and hub position are detected by the present invention and they are translated into an identification of the disk sector using the look-up table.

The timing to be used for exchanging data between the read/write head and the storage device of the invention can be based upon the actual detected position within each sector as the areas corresponding to each respective bit in the sector are traversed. Alternatively, timing of the data transfer can be based on detecting entry into the first bit position and then measuring an elapsed time according to which respective bits will pass by the read/write head as a result of the known, constant rotational speed of the floppy disk drive. For either alternative, a "read bit value" (e.g., a 1 or a 0) is retrieved from the selected floppy disk data image or partition being exposed by the data storage device in step 71.

Having identified the digital bit value for the current bit position in the selected image, the magnetic transducer is driven with that read bit value in step 72 for a first portion of the bit time (i.e., the time period during which the area of a real floppy disk is moving past the read/write head). The read bit value is driven on the transducer for only a portion of a bit time in order to allow a determination of whether the floppy disk drive is attempting to read from a floppy disk or write to a floppy disk. Thus, in step 73, the driving of the transducer is suspended for a predetermined delay time. The delay time is likewise much less than the full bit time. If conducting a read operation, the read/write head of the floppy disk drive does not generate a magnetic field as it does when conducting a write operation. During the predetermined delay time, a check is made in step 74 to determine whether the transducer is receiving a write bit value from the read/write head of the floppy disk drive. Since commercially available magnetic transducers can be obtained which operate at a much higher data rate than a conventional floppy disk drive, the storage unit can alternate between attempted writing and reading operations so that the magnetic transducer generates enough of a magnetic field during the driving portions during a bit time so that if the floppy disk drive is attempting to read then there is still a sufficient signal to be detected. Likewise, the transducer only needs to "listen" for a portion of the available bit time in order to reliably detect that the floppy disk drive is attempting to write data. If the check in step 74 determines that a write bit value is being received, then write bit values presented by the floppy disk drive at each successive bit position are collected in step 75 until the end of the current sector is reached. Then, the collected bit values are written to the selected image of the data storage device in step 76.

If the check for a write bit value is negative in step 74, then the transducer modulates between reading and writing modes for a sufficient duration to reliably detect whether the floppy disk drive is attempting a write operation. Thus, in step 77 the transducer is again driven with the read bit value for a further portion of the bit time. After the further portion of the bit time, driving of the transducer is once again suspended in step 78 for the predetermined delay time. A check is made in step 79 to determine whether a write bit value is received during the predetermined delay time. If so, then the write operation continues in step 75. Otherwise, a determination is made in step 80 whether sufficient checking for a write operation has been completed. In other words, it may not be necessary to continue to check for a write operation for the entire bit time of the first bit in the new sector. The determination that checking is complete could correspond to a predetermined number of executions of the predetermined delay time, for example. If not done checking then a return is made to step 77. If checking is completed, then a read operation can be assumed to be taking place, and the method continues to present the current read bit value in step 81 until the end of the current bit time. In step 82, the method presents remaining read bit values for the remaining bit times to the floppy disk drive via the transducer until all the stored bits of the current sector have been presented (i.e., until the end of the sector).

Figure 8:
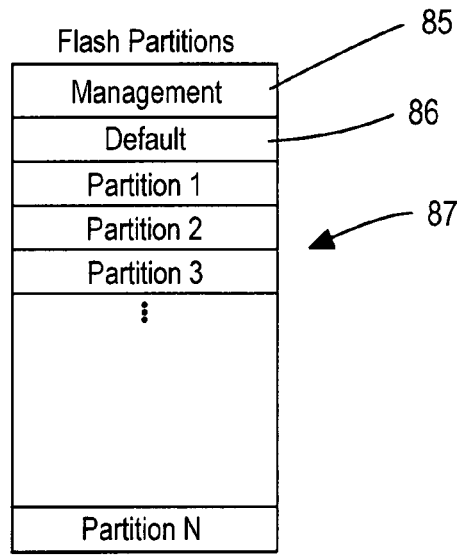
FIG. 8 shows the memory partitions for one preferred embodiment.

One preferred layout of the flash partitions stored in flash memory is shown in FIG. 8. A management partition 85 is provided for holding executable files that are associated with managing the disk images stored in the remaining partitions. Management partition 85 is not exposed to the floppy interface, but is exposed to the USB/Firewire interface for use and modification of the management files. The size of management partition 85 can be any desired size available within the flash memory and is typically much greater than the 1.44 Mbyte partitions for the disk images. Another use of the management partition 85 is to store flash updates for the firmware of the controller. Thus, when the controller boots up, it looks for a flash image with a specific file name in management partition 85. If such a file exists, then the controller updates its firmware from that file and then reboots in order to commence using the new firmware.

A default partition 86 is exposed to the floppy disk drive when the image selector switches are set to "00000000". Default partition 86 may preferably be used to store a floppy disk data image corresponding to a bootable disk, for example. A plurality of further partitions 87 corresponding to addresses 1 through N are selectable according to the corresponding address set using the image selector switches or through the USB/Firewire interface. Preferably, each partition 86 or 87 can be designated as either writable or write protected according to respective flags stored either in the partitions themselves or in management partition 85.

Via the USB/Firewire/Ethernet interface, the contents of the management partition can be viewed and manipulated via the user interface of a remote computing device such as a laptop, producing the display as shown in FIG. 8. As shown in a window 90, the management partition may be represented as a folder including a plurality of sub-folders corresponding to various operating systems with which the data storage device may be used. Each operating system folder may include programs, utilities, and data to assist with using the data storage device in computerized equipment operating using the various operating systems. Thus, a Linux folder 91 includes various files and folders, including a "manage.exe" executable file that can be run on a Linux computer device for manipulating files and partitions stored in the flash memory of the data storage device.

The software residing in the management partition does not have to be installed on the host PC in order to execute. The contents of the management partition are always available to the host PC (e.g., laptop) and can be run directly from the data storage device.

Figure 10:
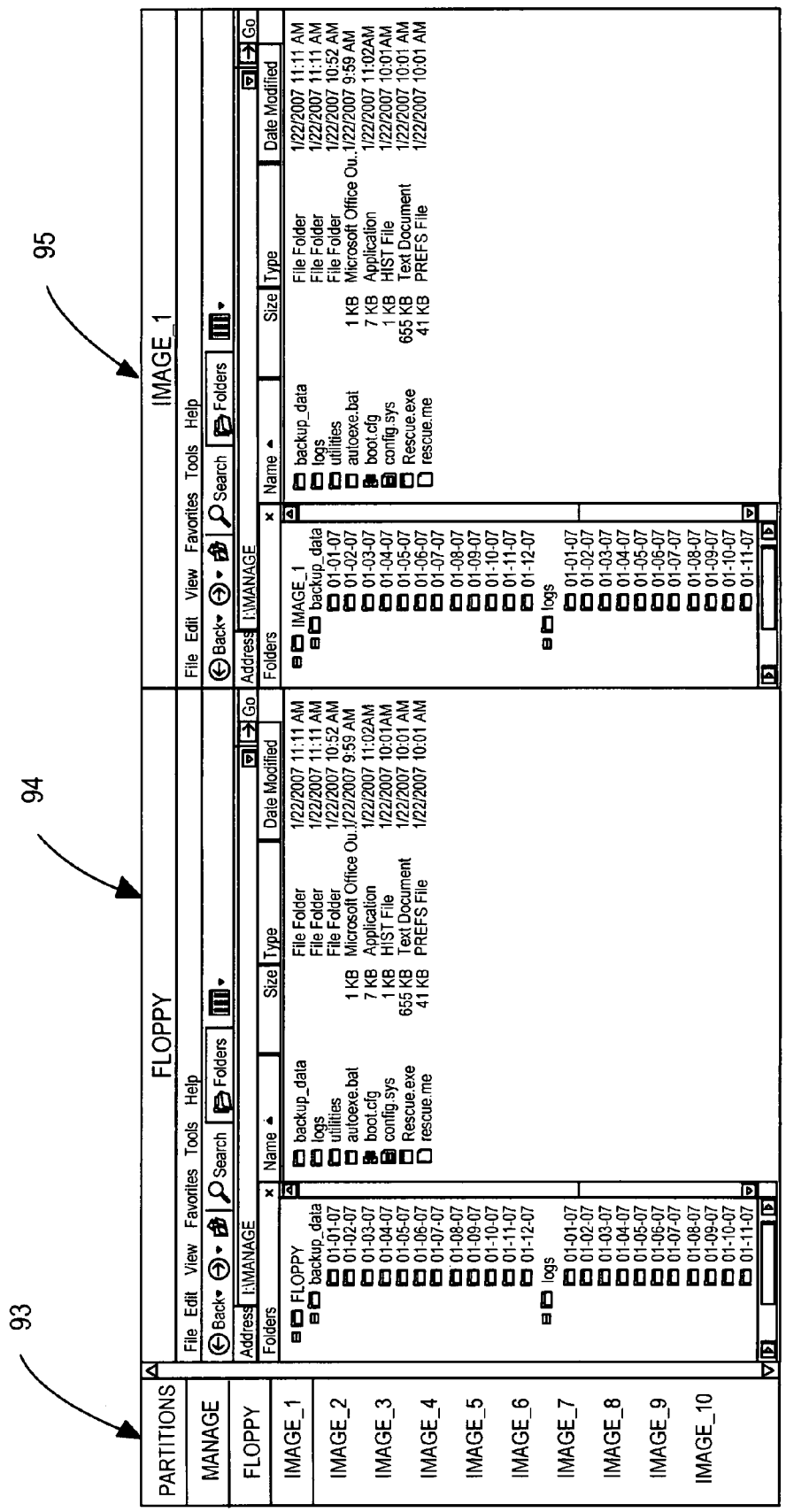
FIG. 10 is a screen shot showing remote access to a Floppy partition and a first Image partition in a preferred embodiment.

FIG. 10 shows a sample screen shot when running the management software using a host PC. Partitions within the flash memory are selectable from a list contained in a partition window 93. Contents of selected partitions are displayed in corresponding windows 94 and 95. Individual files and folders can be manipulated using such conventional commands such as copy, cut, paste, fdisk, backup, and restore.

What is claimed is:

1. A data storage device comprising:
   a housing having a size and shape compatible with being inserted into a floppy disk drive, wherein the floppy disk drive has a spindle and a read/write head;
   a data storage unit within the housing for storing a plurality of floppy disk data images;
   a rotating hub mounted in the housing to receive the spindle driven by the floppy disk drive, the rotating hub having a position encoder for generating a hub position signal;
   a transducer mounted to the housing spanning a range of motion of the read/write head of the floppy disk drive;
   a head position sensor mounted to the housing for generating a head position signal in response to a sensed location of the read/write head; and
   a controller within the housing responsive to the hub position signal and the head position signal to identify a position within a sector of a selected one of the floppy disk data images and to exchange data between the transducer and the identified position of the selected floppy disk data image in the data storage unit.

2. The data storage device of claim 1 further comprising:
   an image selector for manipulation by a user to specify the selected one of the floppy disk data images.

3. The data storage device of claim 2 wherein the image selector comprises a plurality of binary toggle switches mounted to the housing for being manually set to specify an address for the selected one of the floppy disk data images.

4. The data storage device of claim 3 wherein the data storage unit is comprised of a flash memory which is partitioned into at least 256 FAT-16 partitions, wherein each floppy disk data image is loaded into a respective partition, and wherein there are 8 binary toggle switches so that each of the 256 partitions is addressable by a respective combination of the settings of the binary toggle switches.

5. The data storage device of claim 2 further comprising:
   a bus interface coupled to the controller and adapted to be coupled to an external computing device having a user interface for communicating with the controller to specify the selected one of the floppy disk data images.

6. The data storage device of claim 1 wherein the data storage unit is comprised of a flash memory which is partitioned into a plurality of partitions, wherein each floppy disk data image is loaded into a respective partition, and wherein management software for managing the floppy disk data images is loaded into a respective partition.

7. The data storage device of claim 1 further comprising:
   a bus interface coupled to the data storage unit and adapted to be coupled to an external computing device for writing the plurality of floppy disk data images with predetermined data.

8. The data storage device of claim 1 wherein the data storage unit is comprised of a flash memory.

9. The data storage device of claim 1 wherein the transducer comprises an elongated magnetizable strip oriented substantially radially from the rotating hub.

10. The data storage device of claim 1 wherein the head position sensor comprises an elongated pressure sensitive strip oriented substantially radially from the rotating hub.

11. The data storage device of claim 1 wherein the transducer comprises an elongated magnetizable strip oriented substantially radially from the rotating hub and wherein the head position sensor comprises an elongated pressure sensitive strip oriented substantially alongside the elongated magnetizable strip.

12. The data storage device of claim 1 wherein the identified position includes successive bit positions within the sector for coordinating data exchange for respective bits of the floppy disk data image.

13. The data storage device of claim 1 wherein each single bit of a sector corresponds to a rotational range of the rotating hub, wherein rotation of the rotating hub defines a respective bit time for each single bit, and wherein the controller exchanges data by:
   driving the transducer in response to a read bit value within the selected one of the floppy disk data images corresponding to the bit position defined by the hub position signal and the head position signal for less than the corresponding bit time;
   suspending the driving of the transducer;
   sensing whether the read/write head is being driven with a write bit value;
   if a write bit value is detected, then writing corresponding data to the selected one of the floppy disk data images; and
   if a write bit value is not detected then continuing to drive the transducer in response to the read bit value during another portion of the corresponding bit time.

14. The data storage device of claim 13 wherein if a write bit value is not detected then continuing to drive the transducer in successive bit times in response to successive read bit values from the selected one of the floppy disk data images for as long as the hub position signal and the head position signal indicate bit positions within the same sector.

15. The data storage device of claim 1 wherein the controller includes a lookup table for identifying a corresponding sector based on the head position signal and the hub position signal.

16. The data storage device of claim 1 further comprising:
   a write-protect switch on the housing for manually selecting a read-only state, wherein the controller treats the selected one of the floppy disk data images as read-only when in the read-only state.

17. The data storage device of claim 1 further comprising:
   a shutter mounted to the housing that slides during insertion of the housing into the floppy disk drive to uncover the transducer; and
   a shutter switch coupled to the shutter for activating power to the controller when the transducer is uncovered.

18. The data storage device of claim 1 further comprising:
a battery mounted within the housing.

19. A method of presenting selected floppy disk data images to a floppy drive from a high-capacity, portable memory unit, comprising the steps of:
storing a plurality of floppy disk data images in respective partitions of the portable memory unit;
selecting one of the floppy disk data images for presentation;
monitoring a head position of a read/write head of the floppy drive;
monitoring a hub position in response to a spindle of the floppy drive;
identifying a sector and a position within the sector in response to the head position and the hub position; and
exchanging data between the read/write head and the portable memory unit corresponding to the sector and position of the selected floppy disk data image via a transducer aligned with the read/write head.

20. The method of claim 19 wherein the selecting step is comprised of:
generating a partition address by setting a plurality of binary toggle switches associated with the portable memory unit.

21. The method of claim 19 wherein the selecting step is comprised of:
coupling a portable computing device to the portable memory unit via a bus interface; and
utilizing a user interface of the portable computing device to send a selection signal from the portable computing device to the portable memory unit via the bus interface.

22. The method of claim 19 wherein each single bit of a sector corresponds to a rotational range of the spindle and a respective bit time, and wherein the data exchanging step is comprised of:
driving a transducer aligned with the read/write head in response to a read bit value within the selected floppy disk data image corresponding to the current bit position for less than the corresponding bit time;
suspending the driving of the transducer;
sensing whether the read/write head is being driven with a write bit value;
if a write bit value is detected, then writing corresponding data from the read/write head to the selected floppy disk data image; and
if a write bit value is not detected then continuing to drive the transducer in response to the read bit value during another portion of the corresponding bit time.

23. The method of claim 22 wherein if a write bit value is not detected then continuing to drive the transducer in successive bit times in response to successive read bit values from the selected floppy disk data image for as long as the hub position and the head position indicate bit positions within the same sector.

24. The method of claim 19 wherein the sector is identified using a lookup table which is indexed by the head position and the hub position.

* * * * *